April 16, 1957  B. H. BLACK  2,788,980
CHUCK FOR THREADING NIPPLES
Filed Jan. 6, 1955
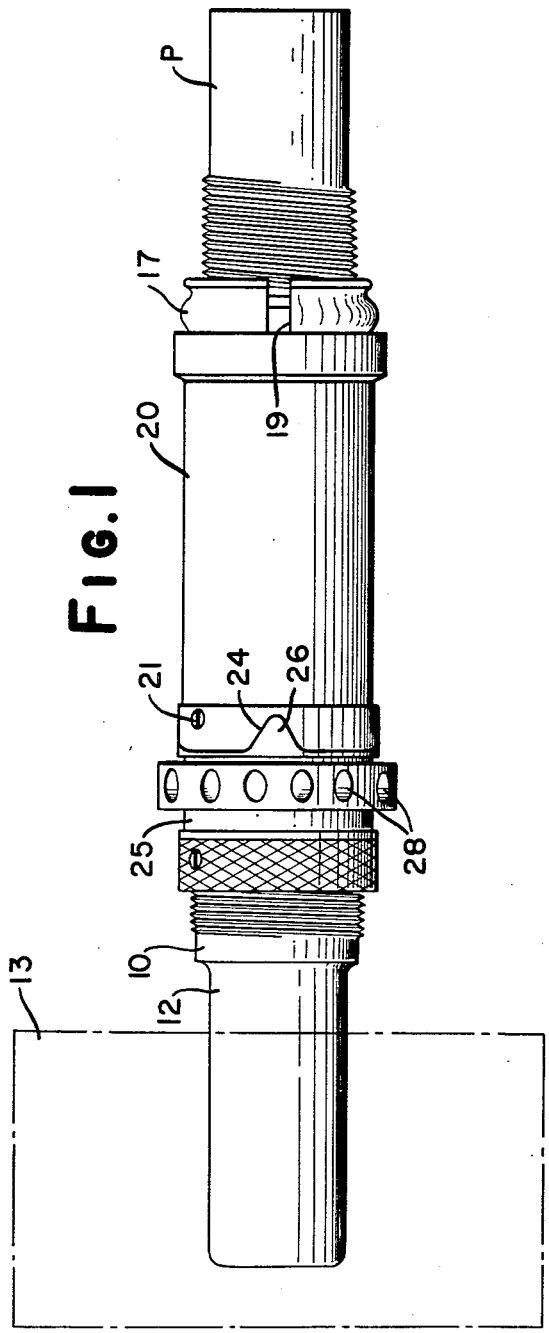
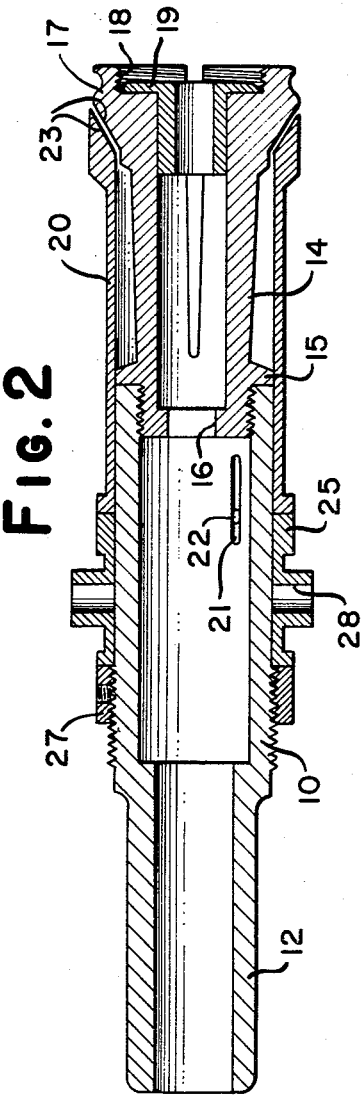
INVENTOR.
BRUCE H. BLACK
BY
Donald G. Dalton
HIS ATTORNEY

United States Patent Office 2,788,980
Patented Apr. 16, 1957

2,788,980

CHUCK FOR THREADING NIPPLES

Bruce H. Black, Gary, Ind.

Application January 6, 1955, Serial No. 480,083

4 Claims. (Cl. 279—7)

This invention relates to a chuck for gripping short length articles, such as pipe nipples.

At least one conventional type of pipe threading machine includes chucks mounted in a rotatable spindle and stationary tools mounted on a carriage. The chuck holds and rotates the pipe, while the tools cut threads or perform other machining operations thereon. Such machines accommodate only pipes of considerable length; they are not capable of holding short length articles, such as nipples.

An object of the present invention is to provide an accessory chuck for machines of the foregoing type for holding articles which are otherwise too short.

A further object is to provide an accessory chuck which can be installed in the regular chuck of a pipe threading machine for holding short length articles already threaded at one end, and is of simple construction, easy to handle, and does not damage the threads already cut.

In accomplishing these and other objects of the invention, I have provided improved details of structure, a preferred form of which is shown in the accompanying drawing, in which:

Figure 1 is a side elevational view of a chuck constructed in accordance with my invention; and Figure 2 is a longitudinal sectional view of the chuck.

The chuck of my invention includes a tubular holder 10 which has a shank portion 12 adapted to be gripped in a rotatable chuck 13 of a conventional pipe threading machine, the latter chuck being shown only diagrammatically. The opposite end of the holder has internal screw threads which carry a jaw device 14. The outside of the jaw device carries an integral flange 15 adapted to abut the end of the holder 10. The inner end of the jaw device contains a socket 16 adapted to be engaged by a wrench inserted through the bore of the holder 10 for installing or removing the jaw device, as when a different size is required. The jaw device includes four integral jaws 17 which tend to spring outwardly. The outer end of the jaws carry internal screw threads 18 adapted to support an article P, such as a pipe nipple, which previously has been threaded at one end. Preferably a collar 19 is supported in the bore of the jaw device 14 behind the nipple P. This collar has a convex outer face which abuts the inner circumferential portion of the nipple to prevent pressure on the threads of the nipple and consequent damage thereto.

For operating the jaws 17, a sleeve 20 is slidably mounted on the outside of the holder 10 and extends over the jaws. The sleeve carries one or more set screws 21 which ride in longitudinal slots 22 in the holder to prevent relative rotation. The exterior of the jaws and the interior of the sleeve have cooperating wedge surfaces 23. The inner end of the sleeve has integral cam surfaces 24. A cam collar 25 is rotatably mounted on the exterior of the holder 10 and has cooperating cam surfaces 26. The cam collar is held against longitudinal movement by a nut 27 threadedly engaged with the exterior of the holder. The cam collar contains a circumferential row of sockets 28, any one of which can be engaged by a suitable tool for rotating the collar. When the collar is rotated in either direction from the position shown in Figure 1, the cam surfaces 26 on the collar ride up the cam surfaces 24 on the sleeve 20 and thus force the sleeve toward the outer end of the chuck, whereupon the wedge surfaces 23 act to close the jaws 17. When the collar is rotated back to the position shown in Figure 1, the spring action of the jaws forces the sleeve to return to this position.

In operation as applied to pipe nipples, a pipe of considerable length is mounted in the machine without my accessory chuck and is threaded at one end in the usual manner. A short length equivalent to that of a nipple is cut from the threaded end of this pipe. These operations are repeated until as many nipples threaded at one end as desired have been cut. Next my accessory chuck is installed in the regular chuck 13 of the machine. Each nipple P in turn is held in my accessory chuck with the end already threaded gripped between the jaws 17 and the unthreaded end projecting as shown in Figure 1. Either the jaws can be made sufficiently springy that they move outwardly to a position where the threads on the nipple clear the threads 18 on the jaws, or else the nipple can be rotated into threaded engagement with the threads 18. The machine is operated to cut threads in the projecting end. While the threads are being cut, the convex face of the collar 19 receives the thrust load from the nipple and consequently there is no damage to the threads previously cut.

From the foregoing description, it is seen that the present invention affords a simple accessory chuck which enables articles of exceeding short length to be threaded in an ordinary pipe threading machine designed to accommodate only much longer articles. Short length articles can be quickly gripped or released and there is no likelihood of damaging threads already formed on one end.

While I have shown and described only a single embodiment of my invention, it is apparent that modifications may arise. Therefore, I do not wish to be limited to the disclosure set forth but only by the scope of the appended claims.

I claim:

1. An accessory chuck for a pipe threading machine for gripping articles which otherwise are too short for the machine comprising a holder having a shank portion at one end adapted to be supported in the chuck of a threading machine, jaws carried by the other end of said holder, means on said holder for closing and opening said jaws, internal screw threads formed on said jaws for engaging threads previously cut at one end portion of an article, and convex thrust means within said jaws adapted to abut an article to remove thrust stresses from the threads thereon.

2. An accessory chuck for a pipe threading machine for gripping articles which otherwise are too short for the machine comprising a holder having a shank portion at one end adapted to be supported in the chuck of a threading machine, spring jaws carried by the other end of said holder, a sleeve slidably mounted on said holder for closing and opening said jaws, rotatable means on said holder for operating said sleeve, internal screw threads formed on said jaws for engaging threads previously cut at one end portion of an article, and convex thrust means within said jaws adapted to abut an article to remove thrust stresses from the threads thereon.

3. An accessory chuck for a pipe threading machine for gripping articles which otherwise are too short for the machine comprising a tubular holder having a shank portion at one end adapted to be supported in the chuck of a threading machine, spring jaws threadedly engaged with the other end of said holder, a sleeve slidably mounted on said holder for closing and opening said jaws, stop means on said sleeve and holder preventing relative rotation of said sleeve, rotatable cam means on said holder for operating said sleeve, internal screw threads formed on said jaws for engaging threads previously cut at one end portion of an article, and convex thrust means within said jaws adapted to abut an article to remove thrust stresses from the threads thereon.

4. An accessory chuck for a pipe threading machine for gripping articles which otherwise are too short for the machine comprising a tubular holder having a shank portion at one end adapted to be supported in the chuck of a threading machine, a jaw device threadedly engaged with the other end of said holder and having integral spring jaws projecting away from the holder, a sleeve slidably mounted for longitudinal movement on said holder, said sleeve and said jaws having cooperating wedge surfaces whereby movement of said sleeve toward said jaws closes the latter and opening of the jaws moves the sleeve away, stop means on said sleeve and said holder preventing relative rotation of said sleeve, a rotatable cam collar mounted on said holder, cooperating cam surfaces on said collar and said sleeve for moving the sleeve longitudinally toward the jaws to close them on rotation of said collar or for releasing the sleeve to allow the jaws to open, internal screw threads formed on said jaws for engaging threads previously cut at one end portion of an article, and convex thrust means within said jaws adapted to abut an article to remove thrust stresses from the threads thereon.

References Cited in the file of this patent

UNITED STATES PATENTS

| | | |
|---|---|---|
| 1,930,261 | Berry | Oct. 10, 1933 |
| 2,147,885 | Dean | Feb. 21, 1939 |
| 2,466,651 | Zagar | Apr. 5, 1949 |
| 2,502,719 | Haley et al. | Apr. 4, 1950 |